(12) United States Patent
Strütt

(10) Patent No.: US 8,991,850 B2
(45) Date of Patent: Mar. 31, 2015

(54) FIFTH WHEEL

(71) Applicant: Jost-Werke GmbH, Neu-Isenburg (DE)

(72) Inventor: Achim Strütt, Riedstadt (DE)

(73) Assignee: Jost-Werke GmbH, Neu-Isenburg (DE)

( * ) Notice: Subject to any disclaimer, the term of this patent is extended or adjusted under 35 U.S.C. 154(b) by 0 days.

(21) Appl. No.: 13/966,528

(22) Filed: Aug. 14, 2013

(65) Prior Publication Data

US 2014/0049024 A1    Feb. 20, 2014

(30) Foreign Application Priority Data

Aug. 14, 2012    (DE) .......................... 10 2012 214 413

(51) Int. Cl.
  *B62D 53/08*    (2006.01)
  *B62D 53/10*    (2006.01)
  *B62D 53/12*    (2006.01)

(52) U.S. Cl.
  CPC ................ *B62D 53/10* (2013.01); *B62D 53/12* (2013.01); *B62D 53/08* (2013.01)
  USPC ......................................... 280/433; 280/436

(58) Field of Classification Search
  CPC ......... B62D 53/12; B62D 53/08; B62D 53/10
  USPC ....................................................... 280/433
  See application file for complete search history.

(56) References Cited

U.S. PATENT DOCUMENTS

| 5,257,796 | A  | * | 11/1993 | Thorwall et al. | 280/434 |
| 5,988,666 | A  | * | 11/1999 | Flater | 280/434 |
| 6,092,825 | A  | * | 7/2000 | Flater | 280/433 |
| 6,352,277 | B1 | * | 3/2002 | Timmings | 280/437 |
| 7,152,869 | B2 | * | 12/2006 | Dupay et al. | 280/433 |
| 7,556,278 | B2 | * | 7/2009 | Roberts et al. | 280/433 |

FOREIGN PATENT DOCUMENTS

| DE | 3803931 A1 | 8/1989 |
| DE | 19820139 A1 | 11/1999 |
| DE | 10 2008 000 799 A1 | 10/2009 |

* cited by examiner

*Primary Examiner* — Kevin Hurley
*Assistant Examiner* — Marlon Arce
(74) *Attorney, Agent, or Firm* — Hudak, Shunk & Farine Co. LPA

(57) ABSTRACT

A fifth wheel coupling with a pull handle, having a pull lever and a safety lever. The pull handle can move in a travel space of a guide mechanism of the fifth wheel coupling plate into a closed position and a release position. Elements are provided for blocking the pull handle, consisting of a safety mechanism with a movably disposed blocking element. The safety mechanism is arranged on the fifth wheel coupling plate. The pull handle has a device for manipulation of the safety mechanism.

19 Claims, 8 Drawing Sheets

FIFTH WHEEL

FIELD OF THE INVENTION

The invention concerns a fifth wheel coupling with a pull handle which has a pull lever and a safety lever and is connected at a first end by a connection element to a closing element for a kingpin.

BACKGROUND OF THE INVENTION

The current prior art shall be explained below by an example in conjunction with FIGS. 1, 2a and 2b:

FIG. 1 shows a fifth wheel coupling 101 in perspective view. The fifth wheel coupling has a fifth wheel coupling plate 102 with an entry opening 103, into which a kingpin (not shown) of a trailer is introduced and can be locked there. For this, underneath the fifth wheel coupling plate 102 is arranged, say, a lock bar 120, which after the kingpin is inserted brings about a locking of the kingpin together with a closure hook (not shown).

To activate the lock bar 120, it is known from the prior art to provide an activating device 130, which has a two-part pull handle 132, which essentially consists of a pull lever 140 and a safety lever 150. On the safety lever 150 is arranged a handle 156. The pull handle 132 extends through an opening 110 in a side wall 104 of the fifth wheel coupling plate 102. Inside this opening 110, the pull handle 132 can be both shoved in the lengthwise direction of the pull handle 132 (arrow $P_1$) and swiveled in the horizontal direction (arrow $P_2$).

FIGS. 2a and 2b are simplified partial views of the fifth wheel coupling 101 shown in FIG. 1 with an activating mechanism 130 according to the prior art, as is described for example in DE 10 2008 000 799 A1.

The pull lever 140 and safety lever 150 can be moved relative to each other in the longitudinal direction, and the pull lever 140 and the safety lever 150 are joined to each other by a tension spring 159. By another tension spring 149, the pull lever 140 is fastened to a component (not shown) of the fifth wheel coupling plate 102. The force of this tension spring 149 is greater than the force of the tension spring 159.

The pull lever 140 has a holding means 142 in the form of a retaining lug, by which the pull lever 140 can bear against the inner surface 106 of the side wall 104 of the fifth wheel coupling plate 102 when the lock bar 120 is in the locking position as shown in FIG. 2a. The pull handle 132 is in its locked position.

The pull lever 140 is hinged by two connection levers 134a, 134b to the lock bar 120. In the locked position of the pull handle 132, the swiveling ability of the pull handle 132 in the opening 110 is blocked by the safety lever 150, which projects to the side relative to the pull lever 140, so that an unintentional loosening of the fixation of the pull handle 132 and thus a loosening from the locked position is prevented. The dimensions of pull handle 132 and opening 110 in the locked position of the pull handle 132 are adapted to each other such that no swiveling of the pull handle 132 is possible.

In order to move the lock bar 120 from its locking position, the pull handle 132 must be pulled out from its locked position into a release position. For this, it is necessary for the pull lever 140 to swivel about the pivot point 138 in the arrow direction $P_3$ in order to loosen its fixation within the opening 110, so that the retaining lug 142 is detached from the inner surface 106 of the side wall 104 and the pull handle 132 as a whole can be pulled outward. It is therefore necessary to pull out the safety lever 150 by means of the handle 156 so far relative to the pull lever 140 that the safety lever clears the opening 110 and the pull lever 140 can swivel in the region of the opening 110 (arrow $P_3$). Only in this pull-out position of the safety lever is it possible to swivel the pull handle 132 freely.

After pulling out the pull handle 132, which brings the lock bar 120 to its open position, the pull handle 132 can be fixed in its release position by means of a retaining lug 144. After letting go of the handle 156, the safety lever 150 is pulled back by the tension spring 159 into its position of rest.

When the kingpin is introduced, the retaining lug 144 of the pull handle 132 is disengaged and the pull lever 140 is pulled back by the tension spring 149. If order for the pull handle 132 and thus the pull lever 140 with its retaining lug 142 to move through the opening 110 into the fifth wheel coupling 101, the pull handle 132 must be elongated, i.e., the safety lever must be placed in its pull-out position. In this pull-out position, the pull handle 132 must be pushed back through the opening 110, which leads to the problem that large frictional forces must be overcome and the pull handle 132 can become skewed and get jammed in the opening 110. Furthermore, it is necessary to overcome the spring force of the tension spring 159.

SUMMARY OF THE INVENTION

The problem of the invention is to provide a fifth wheel coupling that simplifies the locking process of the closing element and makes it more reliable.

This problem is solved with a fifth wheel coupling comprising a fifth wheel coupling plate, a closing element for a kingpin, a pull handle, which has a pull lever and a safety lever and which is connected at a first end by a connection element to the closing element, wherein the pull handle can move in a travel space of a guide mechanism of the fifth wheel coupling plate into a blocking position and a release position, and a mechanism for blocking the pull handle in its closed position, wherein the mechanism for blocking the pull handle consists of a safety mechanism with a movably disposed blocking element, while the safety mechanism is arranged on the fifth wheel coupling plate, and the pull handle has a device for manipulation of the safety mechanism.

The individual positions which the components of the fifth wheel coupling can assume are explained hereafter.

The closing element can move into a locking position and an open position. The locking position designates the position which the locking element assumes after a kingpin has been introduced into the entry opening of the fifth wheel coupling for a locking of the kingpin. The open position designates the position in which the kingpin can travel unhindered in and out of the entry opening of the fifth wheel coupling.

The pull handle can move into a closed position and a release position. In the closed position, the closing element is in the locking position, and this locking position is blocked. In the release position, the closing element is in the open position. Preferably, the pull handle can swivel and be displaced in the lengthwise direction. Preferably, the closed position can be released by a swiveling of the pull handle. One reaches the release position by subsequent pulling in the lengthwise direction of the pull handle. Preferably, a first spring mechanism is provided which moves the pull handle from its release position in the direction of the closed position, so that it can be swiveled into the closed position.

The safety lever can move into a position of rest and a pull-out position. The safety lever can be displaced relative to the pull lever in the lengthwise direction of the pull handle. When the safety lever is in its retracted position, it assumes the position of rest. When the safety lever is pulled out, it is in its pull-out position. Preferably, a second spring mechanism is provided that holds the safety lever in its position of rest.

The blocking element can be moved into a blocking position and a standby position. The blocking element can assume the blocking position when the pull handle is in the closed position. This closed position is then blocked by means of the blocking element. The blocking element is in the standby position when the pull handle is not in the closed position. Preferably, a third spring mechanism is provided to move the blocking element into the blocking position.

In order to fix the pull handle in the locking position of the lock bar, i.e., to prevent an unintentional loosening from the fixed position, a separate safety mechanism is provided, which is arranged on the fifth wheel coupling, preferably near the opening.

The benefit of a separate safety mechanism bringing about an effective blocking of the pull handle in the blocking position regardless of the position of pull lever and safety lever is that the dimensions of the travel space no longer need to be adapted to the dimensions of the pull handle, taking into account certain positions of the safety lever, as is the case with the prior art. The contour of the safety lever preferably lies within the contour of the pull lever for each relative position of safety lever and pull lever. This means that the width of the pull handle is determined by the width of the pull lever. The dimensions of the travel space, especially the width of the travel space, are adapted to the maximum width of the pull lever so that a guiding of the pull handle is assured. Larger dimensions of the travel space then have the further advantage that more room is available for the pull handle as it moves from the release position into the blocking position, so that a jamming or skewing can no longer occur. Furthermore, the spring engaging with the pull lever and pulling the pull handle into the blocking position no longer needs—as in the prior art—to overcome the force of the spring arranged on the safety lever. There is no need to elongate the pull handle.

The providing of a movably disposed blocking element has the advantage that the operating personnel can see from the position of the blocking element whether or not the closing element is in its locking position.

In order to release the pull handle in its closed position, it is necessary to move the blocking element out of the blocking position. Since the safety mechanism is arranged on the fifth wheel coupling plate, it is cumbersome for the operating personnel to activate the blocking element by hand. Since the pull handle has means for manipulation of the safety mechanism, the operating person can conveniently perform the necessary steps to release the blocking at a distance from the fifth wheel coupling.

The safety lever does not block the swiveling ability of the pull handle in the opening, but merely has the task of releasing the safety mechanism when the safety lever is activated.

Preferably, the safety mechanism is arranged on the outer side of the fifth wheel coupling and especially preferably on the outer side of a side wall of the fifth wheel coupling plate. When the safety mechanism is placed on the outer side, the position of the blocking element is especially easily visible. This outer mounting has the benefit that the safety mechanism can be utilized as an indicator device at the same time.

Preferably the means for manipulation of the safety mechanism is arranged on the safety lever. This has the benefit that the familiar two-part pull handles in which the safety lever is movable relative to the pull lever in the lengthwise direction of the pull handle need not be modified in this respect.

The safety lever can be moved preferably from a retracted position of rest into a pull-out position. This movement into the pull-out position is preferably utilized for the activating of the blocking element so that it leaves the blocking position and moves to the standby position.

Preferably the safety lever has a bevel, which in the closed position of the pull handle brings about a swiveling of the pull handle as the safety lever is moved from the position of rest into the pull-out position. This bevel is arranged on the same side of the pull handle as the holding means of the pull lever. This bevel has the advantage that it supports the required swivel movement of the pull handle when releasing the closed position. By the choice of arrangement of the bevel, one can define the time and place for onset of the swivel movement when the safety lever is pulled.

Preferably the means for manipulation of the blocking element is a projection. When the safety lever is pulled out, the projection contacts the blocking element and moves it out from the blocking position. Preferably, the blocking element is able to swivel. Preferably, the blocking element is a pawl.

Preferably the projection is designed as a widening of the safety lever. This involves a widening in the horizontal direction.

Preferably the safety lever has a narrow section which passes, preferably abruptly, into a broad section in the direction of the first end of the pull handle. By this broadening, the projection is fashioned for the manipulation of the safety mechanism. This broadening has the advantage that the blocking element after being activated by the projection retains its standby position until the pull-out position of the safety lever is reached.

Preferably the pull lever has a holding means, preferably in the form of a retaining lug, which is provided to hold the pull lever in the closed position of the pull handle. The holding means in the closed position of the pull handle preferably lies against the edge of the travel space of the guide mechanism.

Preferably the holding means is arranged on the opposite side of the projection.

The safety mechanism is preferably arranged on the same side as the manipulation means on the fifth wheel coupling plate.

In order to block the pull handle in the closed position, the blocking element preferably contacts one side surface of the pull handle. Preferably the blocking element contacts a side surface on the side where the projection is arranged. The blocking of the pull handle in its closed position is thus possible in easy manner.

Preferably the blocking element blocks a swiveling of the pull handle when the pull handle is in its closed position.

Preferably the blocking element in the blocking position lies against one side surface of the pull handle, especially preferably against a side surface of the pull lever. This surface lies opposite the holding means of the pull lever. Thus, the forces acting in the horizontal direction in the closed position lie in the same plane.

Preferably the blocking element can be moved into a standby position and a blocking position. A simple design calls for the blocking element to drop by gravity into the blocking position.

According to another embodiment, the blocking element is pretensioned in its standby position by means of a third spring mechanism. In this case, the blocking element is moved spring-driven into the blocking position. This is of advantage when environmental factors might impair the mobility of the blocking element.

Preferably the blocking element is designed as a pawl.

Preferably the blocking element is arranged on the guide mechanism, especially on or alongside the travel space. The guide mechanism is a part of the fifth wheel coupling in which the pull handle can be guided. Preferably, the travel space is an opening or a recess in the fifth wheel coupling plate. Preferably the guide mechanism is a side wall of the fifth wheel coupling plate with an opening or a recess.

Preferably the dimensions of the pull handle and the travel space are such that the pull handle with safety lever in the position of rest can move from a release position into its closed position through the travel space.

The dimensions of the travel spaces and the pull handle are preferably adapted to each other so that the pull handle can be swiveled for full releasing of the closed position in every relative position of the pull lever and the safety lever.

The pull handle preferably has a second spring mechanism, which is arranged between the pull lever and the safety lever. The second spring mechanism is preferably arranged at the first end of the pull handle. Thus, the spring mechanism lies beneath the fifth wheel coupling plate and is protected, which likewise increases the functional certainty of the activating mechanism.

The pull handle preferably has a handle for manual activation or a pneumatic activating mechanism.

BRIEF DESCRIPTION OF THE DRAWINGS

Preferred embodiments of the invention will be described more closely hereafter by means of the drawings.

There are shown.

DETAILED DESCRIPTION OF THE INVENTION

Figure 1:
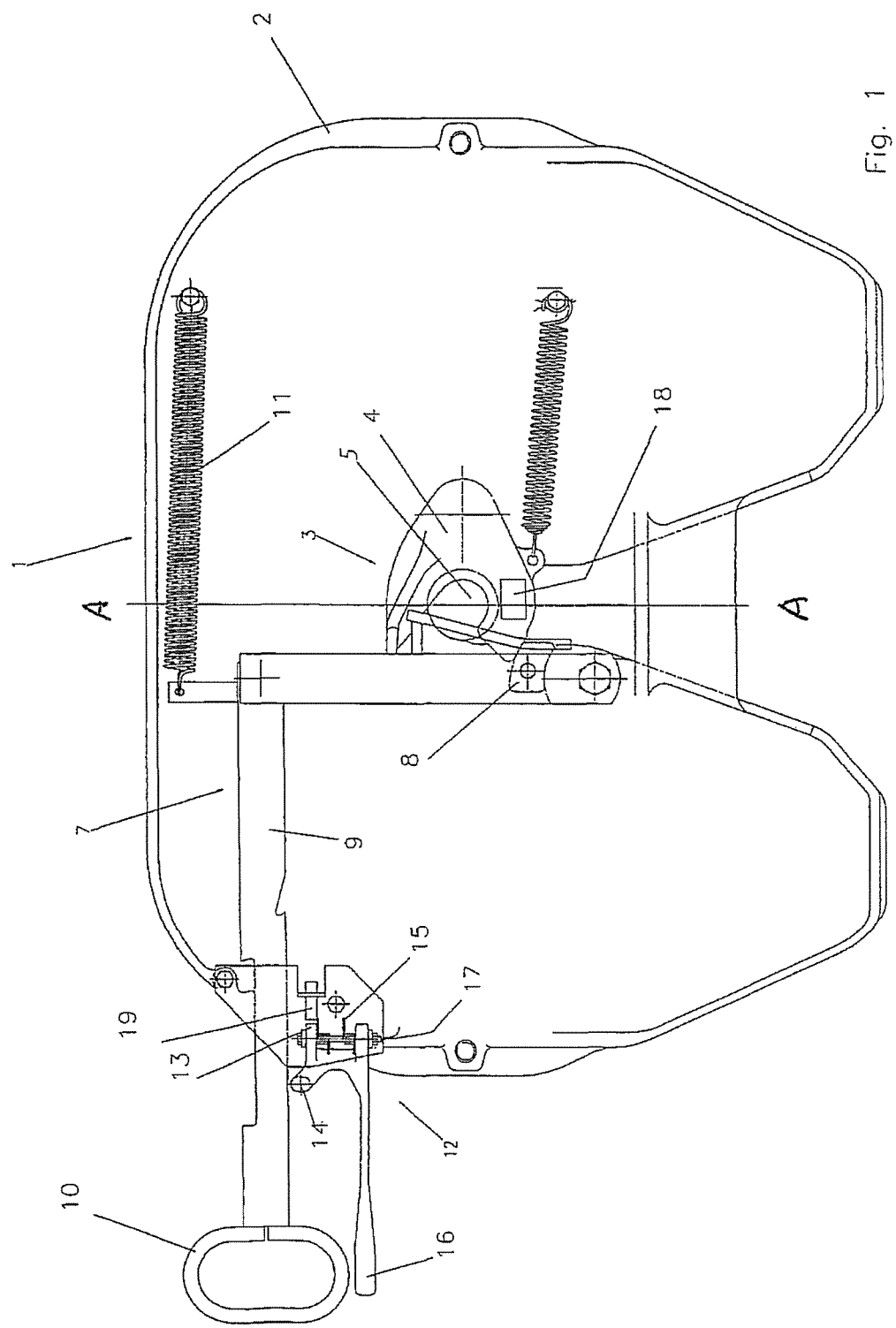
FIG. 1 is a perspective representation of a fifth wheel coupling according to the prior art, FIG. 2a,b is a partial views of the fifth wheel coupling shown in FIG. 1 with an activating mechanism according to the prior art in two different positions, FIGS. 3+4 are an activating mechanism according to the invention in two positions corresponding to the representations of FIGS. 2a and 2b, and FIGS. 5-7 are magnified views of the activating mechanism to explain the safety mechanism.
Figure 2A:
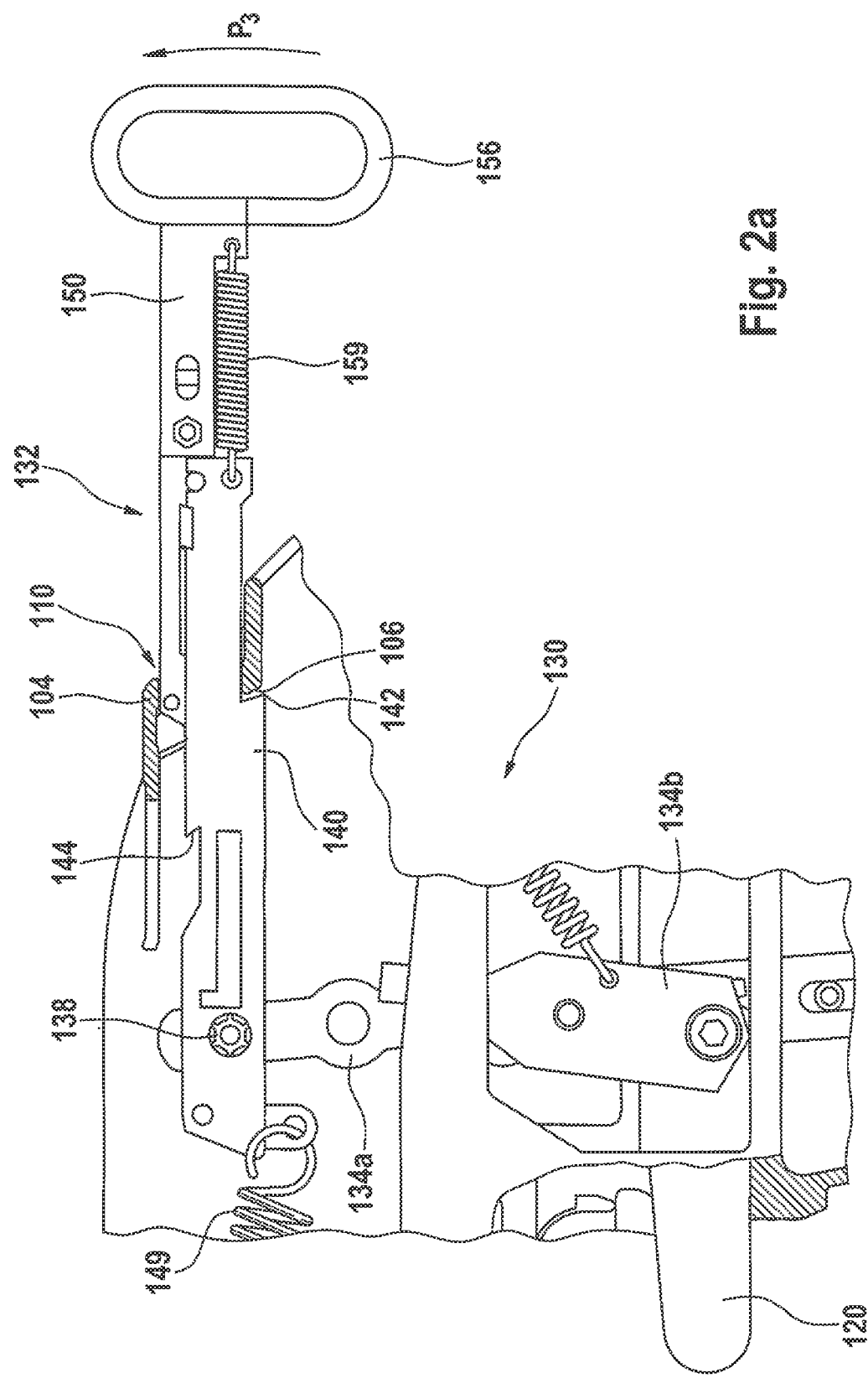
Figure 2B:
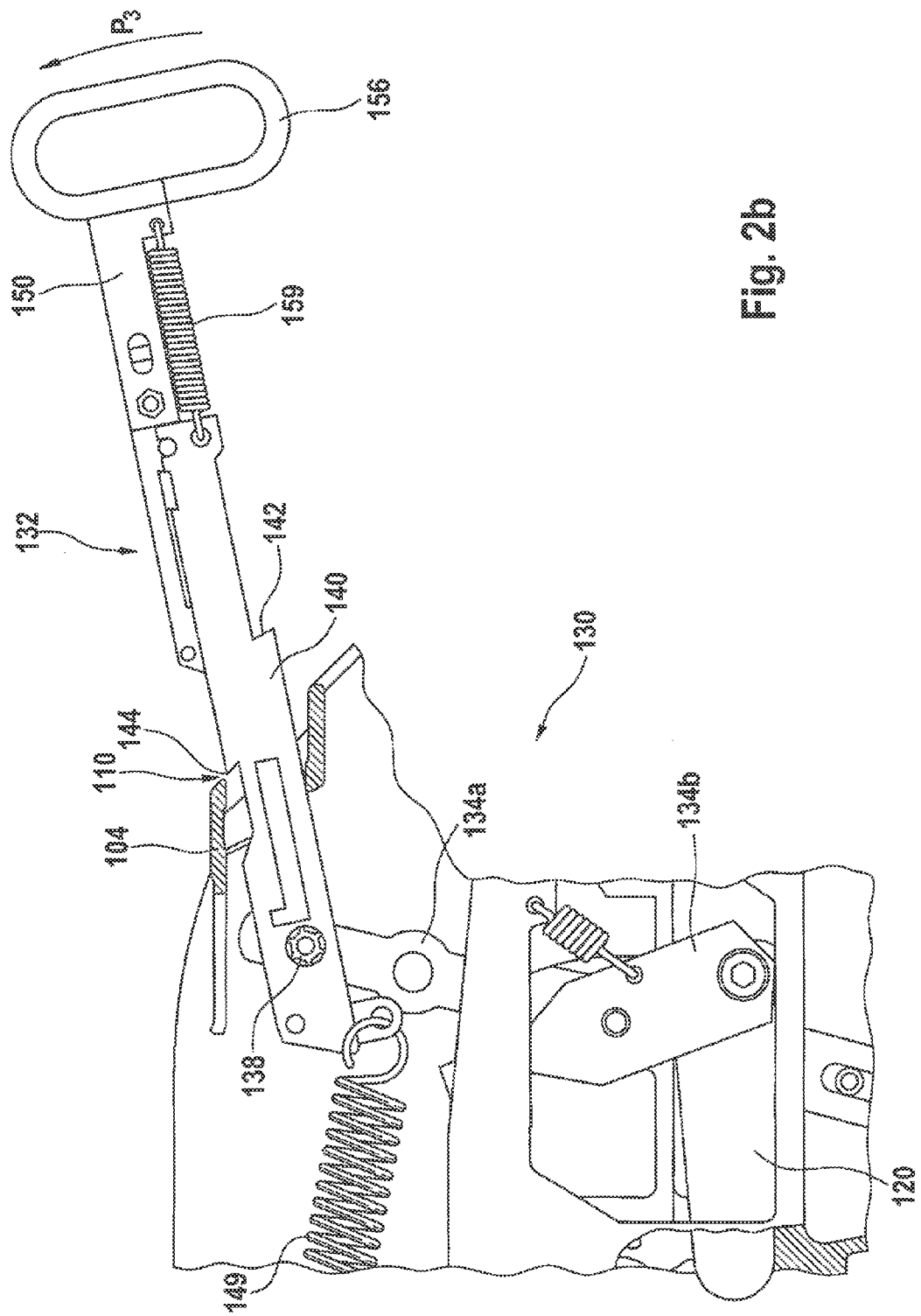
Figure 3:
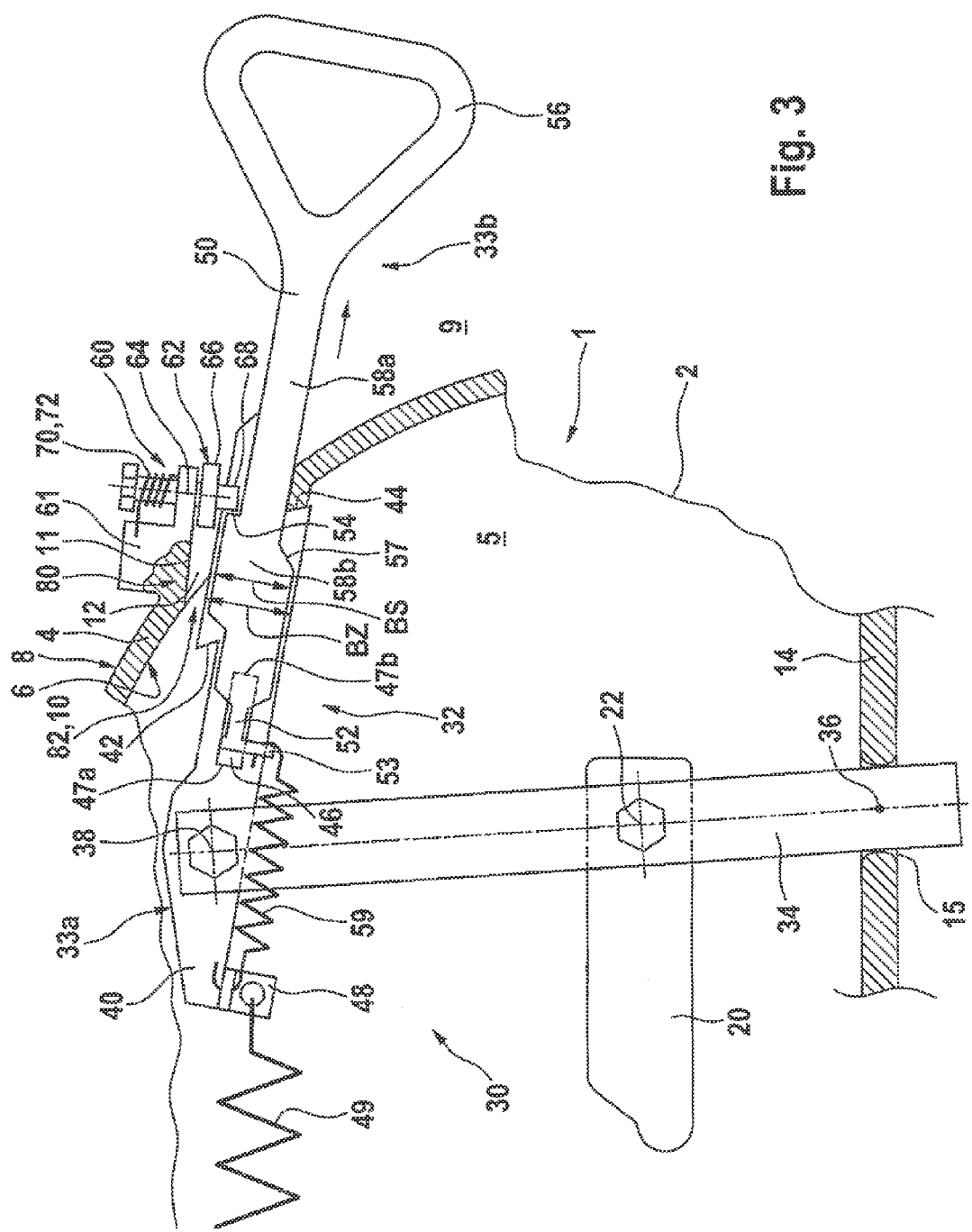
Figure 4:
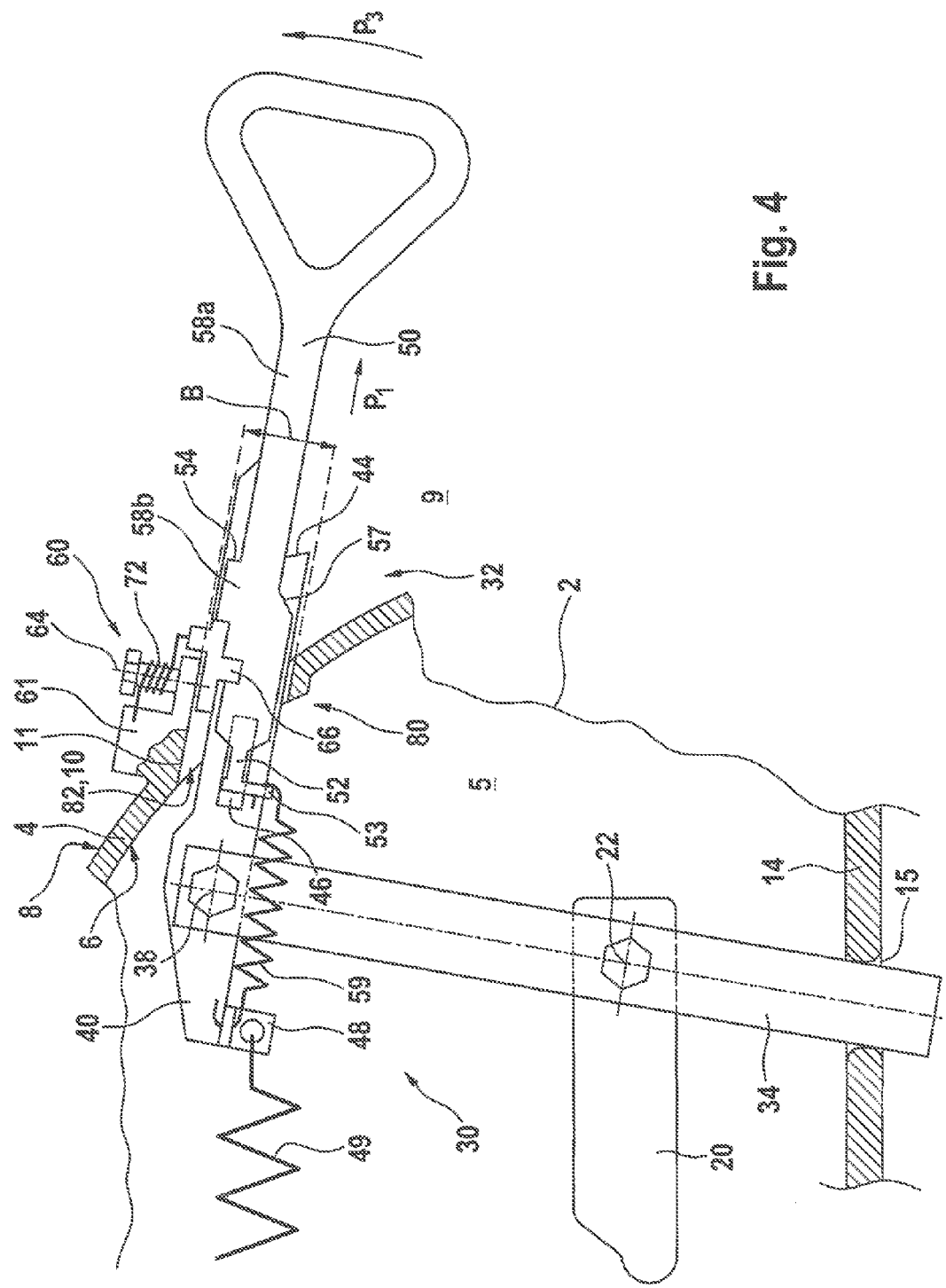

FIGS. 3 and 4 show a partial view of part of a fifth wheel coupling plate 2 of a fifth wheel coupling 1 with side wall 4. The space beneath the fifth wheel coupling plate 2 that is bounded by the side wall 4 forms the inner space 5. The space outside the side wall 4 is the outer space 9.

The side wall 4 forms with the opening 10 a guide mechanism 80 for a pull handle 32 of the activating mechanism 30, the pull handle 32 having a pull lever 40 and a safety lever 50. The travel space 82 is defined by the boundary of the opening 10.

The safety lever 50 can move in the lengthwise direction relative to the pull lever 40. For this, a guide opening 46 is provided in the pull lever 40, in which a guide element 52 of the safety lever 50 is led. The length of the guide opening 46 limits the pull-out path of the safety lever 50 and defines at its two ends 47a,b the position of rest and the pull-out position of the safety lever 50.

The pull lever 40 has in a middle region of the pull handle 32 a width $B_Z$ that is slightly greater than the width $B_S$ of the safety lever 50. $B_Z$ can also be equal to $B_S$. The contour of the safety lever 50 should however lie within the contour of the pull lever 40 in regard to the position of rest.

The pull lever 40 has retaining lugs 42 and 44 on opposite sides in opposing directions. With the retaining lug 44, the pull lever 40 in the closed position of the pull handle 32 lies against the inner surface 6 of the side wall 4. Furthermore, the safety lever 50 has a projection 54, forming the means of manipulation of the safety mechanism 60. The projection 54 is formed by the transition from a narrow section 58a to a broad section 58b of the safety lever 50.

The pull lever 40 at the first end 33a is connected at the pivot point 38 to an intermediate lever 34, which is hinged at the pivot point 22 to the closing element 20. The intermediate lever 34 extends beyond the pivot point 22 and is led in a recess 15 of a rib 14 of the fifth wheel coupling plate 2. Thus, the intermediate lever 34 can swivel about the axis 36.

The pull lever 40 extends beyond the pivot point 38 and has a bracket 48 at the end 33a, to which is fastened on the one hand a first spring mechanism 49 and on the other hand a second spring mechanism 59. The spring mechanism 49 is fastened to a structural part of the fifth wheel coupling plate (not shown) and in the embodiment shown here it is a tension spring.

The force of the second spring mechanism 59 is designed to be less than that of the first spring mechanism 49. The second spring mechanism 59 is arranged on a bracket 53 of the guide element 52 of the safety lever 50. The arrangement of the spring mechanism 59 at the first end 33a of the pull handle 32 has the advantage that the spring mechanism 49 lies in the inner space 5 and thus in a protected area of the fifth wheel coupling 1.

The tension spring 49 holds the safety lever 50 in its position of rest, in which the guide element 52 lies against the end 47a of the guide opening 46.

The tension spring 49 holds the pull lever 40 and thus the pull handle 32 in its closed position.

At the second end 33b, situated in the outer space 9, the pull handle 32 has a handle 56, which is fastened to the safety lever 50. By means of the handle 56, the pull handle 32 can be swiveled and moved in the lengthwise direction. Instead of the handle 56, a corresponding pneumatic activating mechanism (not shown) can also be provided.

On the outer surface 8 of the wail 4 there is shown a safety mechanism 60 that comprises a holding element 61 fastened to the wall 4, on which a blocking element 62 in the form of a pawl 63 can swivel about a swivel axis 64. By means of a third spring mechanism 70 in the form of a helical spring 72, the pawl 63 is forced into a downward swiveled blocking position (see FIG. 5).

Thus, the safety mechanism 60 is arranged on the guide mechanism 80 and situated on the opposite side of the retaining lug 44.

Figure 5:
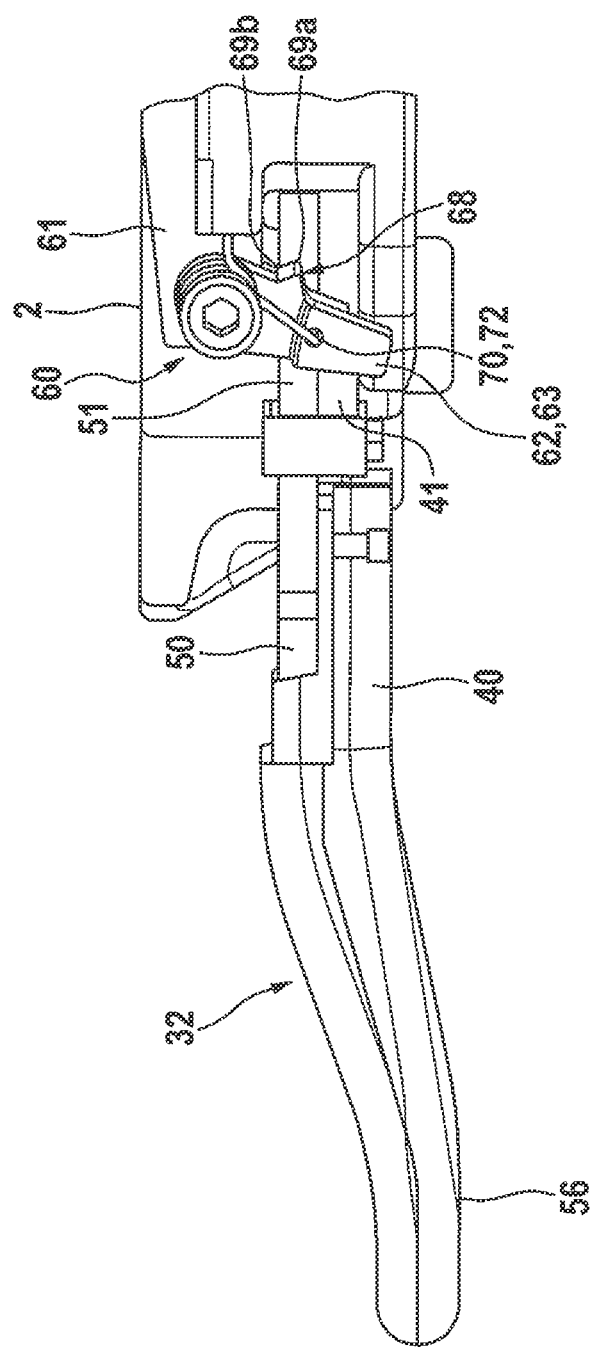
Figure 6:
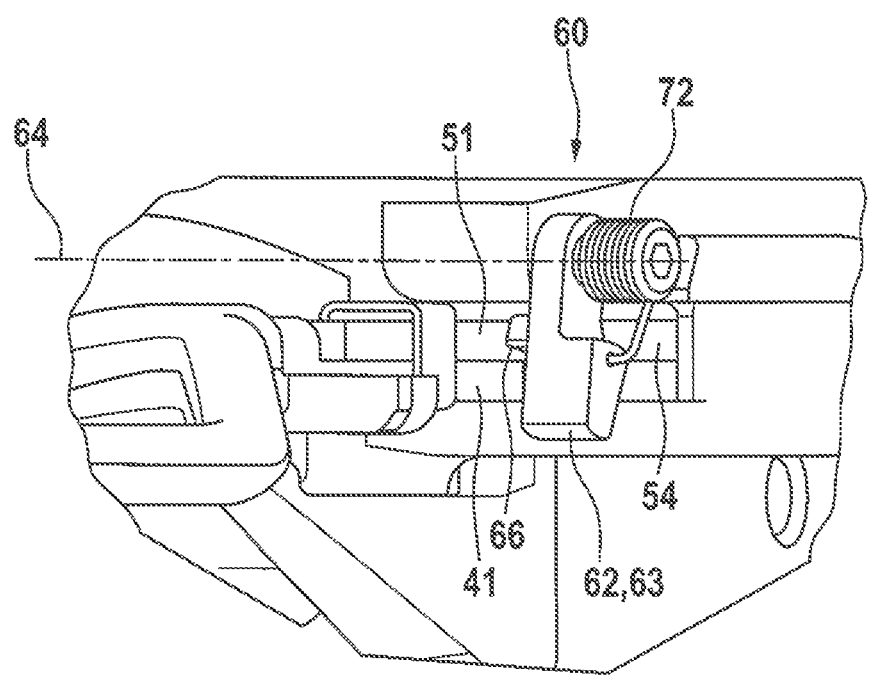

As is shown in FIGS. 5 and 6, the pawl 63 has a pin 66 arranged at the side. Furthermore, the pawl 63 has a projection 68 on its bottom side, which is configured as a triangle with a tip 69a and a slide bevel 69b. This projection 68 extends parallel to the swivel axis 64 and is also configured at the pin 66 (see FIGS. 3 and 6). The safety lever 50 has a projection 54 located opposite the safety mechanism 60. This projection 54 forms the means for manipulation of the safety mechanism 60.

The projection 68 of the pawl 63 lies opposite the projection 54 of the safety lever 50 as well as the side surface 51 of the safety lever 50.

Figure 7:
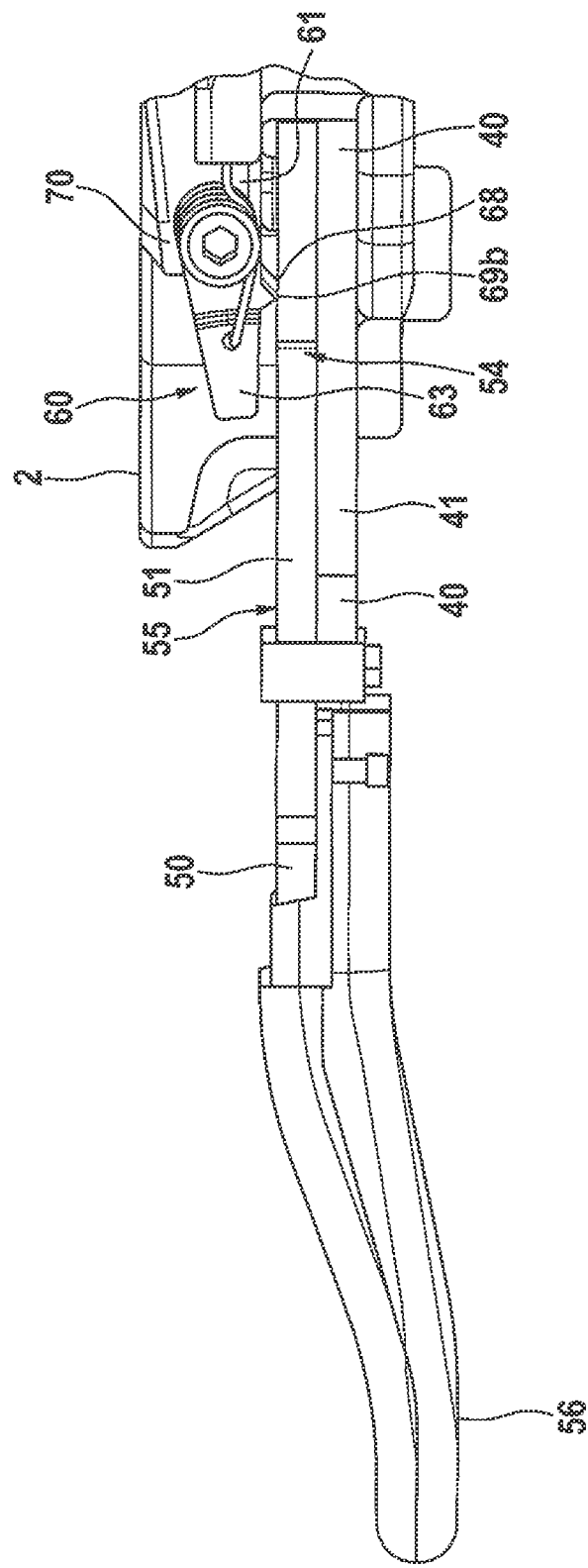

In FIGS. 5 and 7, both positions of the pawl 63 are shown in side view. As can be seen, the pawl 63 has a wedge shape and the pawl 63 is pretensioned in its blocking position by means of the third spring mechanism 70 (FIG. 5).

In FIG. 7 one can see that, when the safety lever 50 is pulled out, the pawl 63 of the safety lever 50 is circumvented by the projection 54 and thus the pawl 63 and the safety mechanism 60 is released, making possible a free swiveling of the pull handle 32. The pawl 63 is in its standby position.

From the position of the pawl 63 one can recognize what position the look bar is in.

The mode of functioning of the activating mechanism is explained more closely below by means of FIGS. 3 to 7.

In FIG. 3, the closing element 20 is in the locking position. This means that the pull handle 32 is in the closed position, while the safety lever 50 is in the position of rest. The pull lever 40 lies with its retaining lug 44 at the edge of the opening 10 against the inner surface 6 of the wall 4 and thus it cannot be displaced in the lengthwise direction.

The dimensions of the opening 10 and the pull handle 32 are adapted to each other so that even in the closed position there is a free space 12 between the pull handle 32 and the edge of the opening 11, so that the pull handle 32 can swivel within the opening 10 and then be moved out unhindered in the axial direction within the opening 10.

To prevent an unintentional swiveling of the pull handle 32 from the closed position, the safety mechanism 60 is provided, lying with the pawl 63 against a side surface 41 of the pull lever 40 and thus blocking the pull handle 32.

To move the closing element 20 from the locking position to the open position, the pull handle 32 is moved manually to its release position. At first the safety lever 50 is pulled against the force of the spring 59 from its position of rest to its pull-out position. In this process, the projection 54 makes contact with the slide bevel 69b of the projection 68, so that the pawl 63 is lifted against the force of the spring 72 of a third spring mechanism 70 until the tip 69a lies against the top side 55 of the safety lever 50 (see FIG. 4 and FIG. 7). The pawl 63 is now in the standby position.

With increasing pull-out length, the bevel 57 comes into contact with the edge 11 of the opening 10, which triggers or sustains the swivel motion. The pull handle 32 is swiveled in the opening 10, and the retaining lug 44 is detached from the side wall 4. After this, the pull handle 32 is again pulled out against the force of the spring of the second spring mechanism 59 so that the closing element 20 is unlocked (see FIG. 4). The pull lever 40 can then be fixed in this position by engaging the pull lever 40 with the retaining lug 42 against the outer surface 8 of the side wall 4.

To bring the closing element 20 back to the locking position, the pull handle 32 is swiveled in the opposite direction so that the retaining lug 42 is detached from the side wall 4. The safety lever 50 is in its position of rest.

By letting go of the safety lever 50, the pull handle 32 is pulled in by the force of the spring of the first spring mechanism 49. The pull handle 32 slides unhindered through the opening 10, whose width B is greater than the width $B_Z$ of the pull lever 40.

When the pull handle 32 is pulled back swiveled in, and hooked by means of the retaining lug 44, the safety lever 50 wanders inward under the pawl 63 and when the projection 54 is reached the pawl 63 drops back into its blocking position and blocks the pull handle 32 when the pull handle 32 has reached its closed position (see FIG. 3).

LIST OF REFERENCES 1 fifth wheel coupling
2 fifth wheel coupling plate
4 side wall
5 inner space
6 inner surface of side well
8 outer surface of side wail
9 outer space
10 opening
11 edge of opening
12 free space
14 rib
15 recess
20 closing element
22 pivot point
30 activating mechanism
32 pull handle
33a first end
33b second end
34 intermediate lever
36 swivel axis
38 pivot point
40 pull lever
41 side surface
42 retaining lug
44 retaining lug, holding means
46 guide opening
47a end of the guide opening
47b end of the guide opening
48 bracket
49 first spring mechanism
50 safety lever
51 side surface
52 guide element
53 bracket
54 projection
55 top side
56 handle
57 bevel
58a narrow section
58b broad section
59 second spring mechanism
60 safety mechanism
61 holding element
62 blocking element
63 pawl
64 swivel axis
66 pin
68 projection
69a tip
69b slide bevel
70 third spring mechanism
72 helical spring
80 guide mechanism
82 travel space
101 fifth wheel coupling
102 fifth wheel coupling plate
103 entry opening
104 side wall
106 inner surface of side wail
110 opening
120 lock bar
130 activating mechanism
132 pull handle
134a connection lever
134b connection lever
138 pivot point
140 pull lever
142 holding means
144 retaining lug
149 tension spring
150 safety lever
156 handle
159 tension spring
B width of opening
$B_S$ width of safety lever
$B_Z$ width of pull lever
$P_1$ arrow
$P_2$ arrow
$P_3$ arrow

What is claimed is:

1. A fifth wheel coupling, comprising:
a fifth wheel coupling plate,
a closing element for a kingpin,
a pull handle, which has a pull lever and a safety lever and which is connected at a first end by a connection element to the closing element,
wherein the pull handle can move in a travel space of a guide mechanism of the fifth wheel coupling plate into a blocking position and a release position, and
a mechanism for blocking the pull handle in a closed position of the pull handle, wherein the mechanism for blocking the pull handle includes a safety mechanism with a movably disposed blocking element, while the safety mechanism is arranged on the fifth wheel coupling plate, and the pull handle has a device for manipulation of the safety mechanism.

2. The fifth wheel coupling according to claim 1, wherein the safety mechanism is arranged on an outer surface of the fifth wheel coupling plate.

3. The fifth wheel coupling according to claim 1, wherein the device for manipulation of the blocking element is arranged on the safety lever.

4. The fifth wheel coupling according to claim 1, wherein the safety lever can be moved in a lengthwise direction of the pull handle relative to the pull lever into a pull-out position and a position of rest.

5. The fifth wheel coupling according to claim 4, wherein the device for manipulation of the blocking element moves the blocking element from a blocking position to a standby position when the safety lever is moved into the pull-out position.

6. The fifth wheel coupling according to claim 1, wherein the device for manipulation of the blocking element is a projection.

7. The fifth wheel coupling according to claim 1, wherein the safety lever has a narrow section, which passes into a broad section in the direction of a first end of the safety lever.

8. The fifth wheel coupling according to claim 1, wherein the pull lever has at least one holding lug, which is designed to hold the pull lever in the closed position of the pull handle.

9. The fifth wheel coupling according to claim 1, wherein the blocking element in its blocking position blocks a swiveling of the pull handle when the pull handle is in the closed position.

10. The fifth wheel coupling according to claim 1, wherein the blocking element drops into the blocking position by gravity.

11. The fifth wheel coupling according to claim 5, wherein the blocking element is pretensioned in its standby position by a third spring mechanism.

12. The fifth wheel coupling according to claim 1, wherein the blocking element is arranged on the guide mechanism.

13. The fifth wheel coupling according to claim 1, wherein the travel space is an opening or a recess in the fifth wheel coupling plate.

14. The fifth wheel coupling according to claim 1, wherein the dimensions of the travel space and the pull handle are adapted to each other such that the pull handle with the safety lever in the position of rest can be moved from a release position into the closed position of the pull handle through the travel space.

15. The fifth wheel coupling according to claim 1, wherein the pull handle has a second spring mechanism that is arranged between the pull lever and the safety lever and the second spring mechanism is arranged on the first end of the pull handle.

16. The fifth wheel coupling according to claim 1, wherein the pull handle has a handle or a pneumatic activating mechanism.

17. The fifth wheel coupling according to claim 4, wherein the safety lever has a bevel, which brings about a swiveling of the pull handle in the closed position of the pull handle when the safety lever is moved from the position of rest into the pull-out position.

18. The fifth wheel coupling according to claim 1, wherein the safety mechanism is arranged on an outer surface of the fifth wheel coupling plate, wherein the device for manipulation of the blocking element is arranged on the safety lever, wherein the safety lever can be moved in a lengthwise direction of the pull handle relative to the pull lever into a pull-out position and a position of rest, wherein the device for manipulation of the blocking element moves the blocking element from a blocking position to a standby position when the safety lever is moved into the pull-out position, and wherein the device for manipulation of the blocking element is a projection.

19. The fifth wheel coupling according to claim 18, wherein the safety lever has a narrow section, which passes into a broad section in the direction of a first end, wherein the pull lever has at least one holding lug, which is designed to hold the pull lever in the closed position of the pull handle, wherein the blocking element in its blocking position blocks a swiveling of the pull handle when the pull handle is in the closed position, wherein the blocking element drops into the blocking position by gravity, and wherein the blocking element is pretensioned in its standby position by a third spring mechanism.

* * * * *